P. M. F. DUGIT-GROS, CALLED M. DUGIT.
INDICATING DEVICE FOR MEASURING APPARATUS.
APPLICATION FILED JUNE 14, 1920.
1,361,697. Patented Dec. 7, 1920.
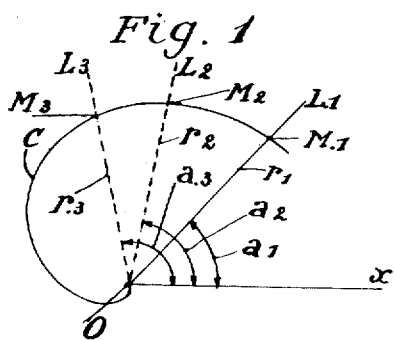
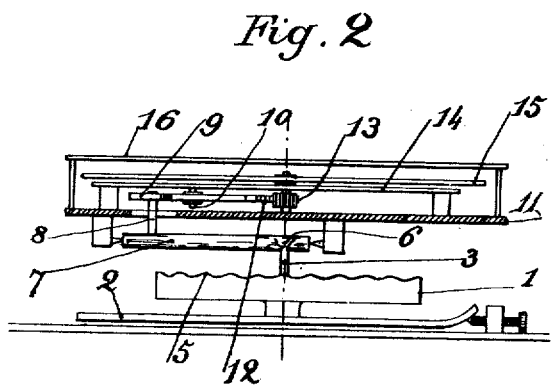
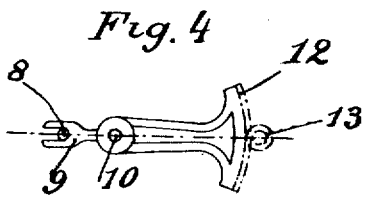
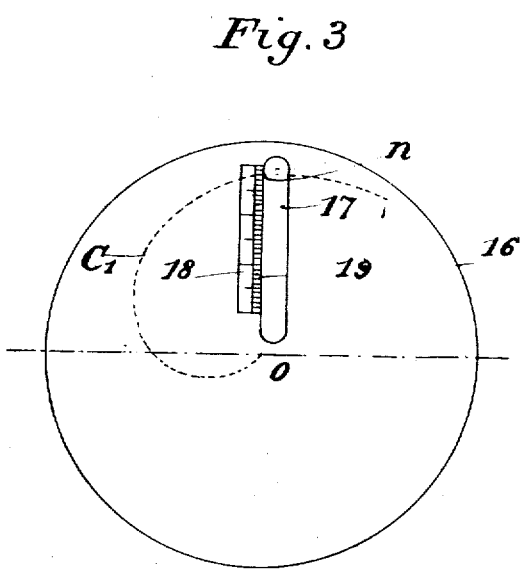
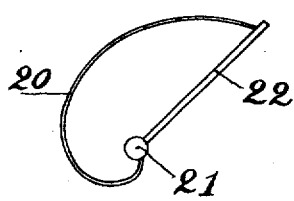

P. M. F. DUGIT-GROS, CALLED M. DUGIT.
INDICATING DEVICE FOR MEASURING APPARATUS.
APPLICATION FILED JUNE 14, 1920.

1,361,697.

Patented Dec. 7, 1920.

3 SHEETS—SHEET 3.

UNITED STATES PATENT OFFICE.

PIERRE MAURICE FRANCOIS DUGIT-GROS, CALLED MAURICE DUGIT, OF LYON, FRANCE.

INDICATING DEVICE FOR MEASURING APPARATUS.

1,361,697.   Specification of Letters Patent.   Patented Dec. 7, 1920.

Application filed June 14, 1920. Serial No. 388,981.

*To all whom it may concern:*

Be it known that I, PIERRE MAURICE FRANCOIS DUGIT-GROS, called MAURICE DUGIT, a citizen of the Republic of France, residing at Lyon, France, have invented a new and useful Indicating Device for Measuring Apparatus, of which the following is a specification.

The invention relates to an indicating device of constant sensitiveness applicable to measuring apparatus, such as barometers, manometers, and the like.

This arrangement comprises a graduated scale and a plate mounted on the same axis as the scale and carrying one or more curves representing in polar coördinates the variations of the dimension to be measured as a function of the angular displacements of the ruler. The scale and the plate being movable in relation to each other, the reading taken at the point of intersection of the scale and the curve gives the desired value.

In the accompanying drawings:—

Figure 1. is a diagram showing the method of obtaining the curves placed on the plate.

Figs. 2, 3, and 4 represent by way of example a barometer according to the invention.

Fig. 2. is a vertical section.

Fig. 3. is a plan.

Fig. 4. shows a detail.

Fig. 5. shows a modification.

Figure 6:
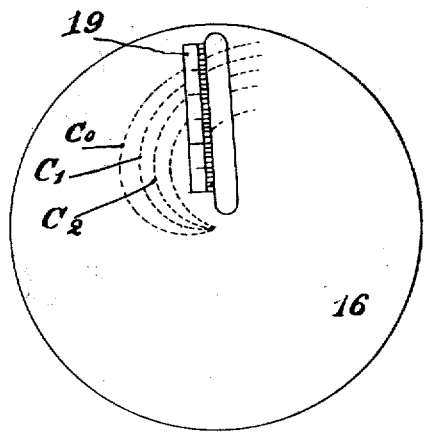

Fig. 6 shows an apparatus comprising a plurality of curves.

Figure 7:
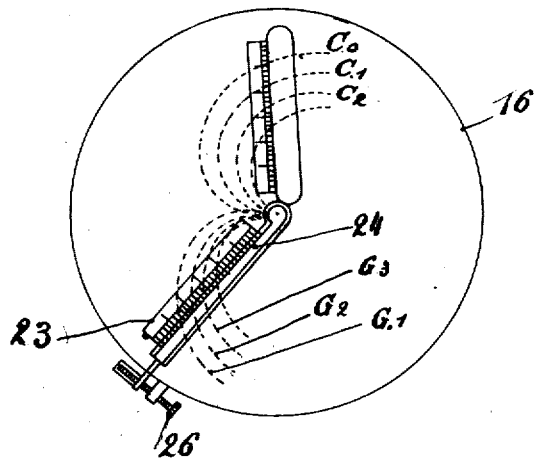

Fig. 7. shows an apparatus serving equally as a barometer and altimeter.

Figs. 8 to 11, relate to indicating devices comprising in addition to the principal spiral one or more auxiliary spirals to indicate the units of inferior order.

Figure 8:
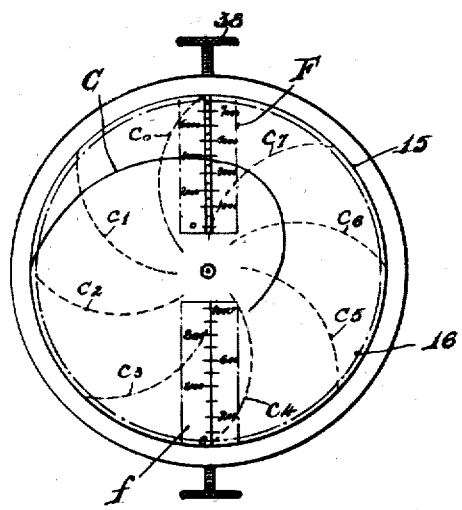

Fig. 8. is an elevation of an altimeter.

Figure 9:
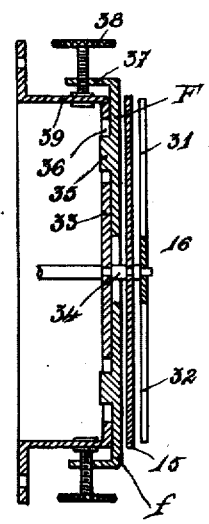

Fig. 9. is a vertical section.

Figure 10:
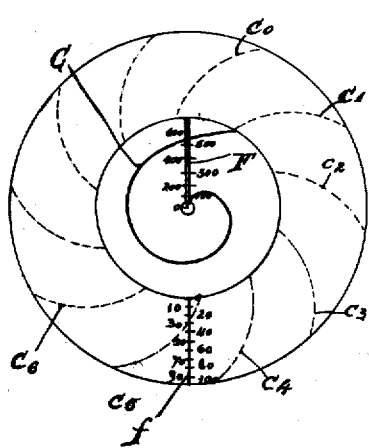

Fig. 10. shows a modification.

Figure 11:
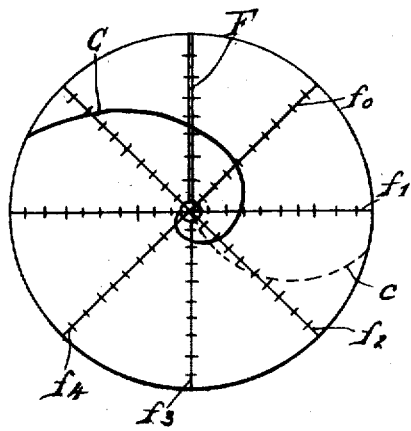

Fig. 11. shows a modification with one single auxiliary curve and several scales for the units of inferior order.

The barometer shown in Figs. 2, 3 and 4 comprises a chamber 1 in which a vacuum has been created, and which rests upon a plate 2.

This chamber is closed at its upper portion by an aneroid diaphragm 5 which moves more or less according to the value of the atmospheric pressure.

A rod 3 fixed to the center of the diaphragm 5 acts upon a finger 6 carried by a horizontal shaft 7 which oscillates according to the displacements of the rod 3. A second finger 8 carried by the shaft 7 engages with a fork 9 which can pivot around a vertical pin 10 fixed upon a plate 11.

The fork 9 is formed in one with a toothed sector 12 which meshes with a pinion 13. The axis of this pinion 13 traverses a second plate 14 and carries keyed upon it a plate 15 upon which there is traced a curve C, such as is shown in Fig. 1.

Above the plate 15 there is arranged a cover 16 preferably made of transparent material and provided with an aperture 17 one of the edges of which passes through the axis of rotation of the plate 15. A scale 18 with graduations 19 is arranged along the edge of the aperture 17, the graduations 19 being at distances apart.

The curve C traced on the plate 15 is obtained by translating into polar coördinates the variations of the dimension to be measured (in this case the atmospheric pressure) in function of the displacement of the plate in an angular direction.

This curve is traced by points. On a straight line $OL_1$, forming with the polar axis $Ox$ an angle $a_1$, and corresponding to a relative determined position for the plate and for the scale, there is drawn a length $OM_1 - r_1$, in proportion to the corresponding value of the barometric pressure. The same observation is observed for the direction $OL_2$, $OL_3$, etc., and by joining all the points obtained $M_1$, $M_2$, $M_3$, we get the curve C.

The graduation 19 having the same module of proportionality as that which has been selected for the construction of the curve C, the result is that the division $n$ read at the intersection of the edge of the scale and of the curve C will give the value of the barometric pressure (for example in mm. of mercury); if it be desired to obtain a greater precision there may be added to the scale 18 a vernier sliding along the graduation 19. Instead of tracing a curve C on the circular plate 15 this curve can be formed by forming the edge of the plate of such a curvature. The curve C may also be formed by means of a rigid wire 20 (Fig. 5) or wire fixed at one part to an axis 21 and at the other part to a radial rod 22.

In the case of the circular plate the variations of temperature may be taken into consideration. In this case there will be traced a network of curves $C_0$, $C_1$, $C_2$, corresponding to the temperatures $t_0$, $t_1$, $t_2$.

The temperature indicated by the thermometer being for example $t_2$, there will be read off at the intersection of the corresponding curve $C_2$ and at the graduation 19 the barometric pressure.

Fig. 7 shows the arrangement forming the subject matter of the invention applied to a combined barometer and altimeter. In this case there are traced upon the plate 16 in addition to the curves $C_0$, $C_1$, $C_2$, corresponding to the temperatures $t_0$, $t_1$, $t_2$, curves $G_0$, $G_1$, $G_2$, giving the altitude for the same temperature.

The altitude is read off on a scale 23 similar to the scale 18 and arranged along a frame 24. The scale 23 is graduated in altitudes and the frame 24 is articulated around the axis common to the plate 15 and to the cover 16. A screw 26 permits of the variation of the angle of the scale 23 in relation to the scale 18 so as to allow for local atmospheric variations or the altitude of the initial station, if it be desired to measure the difference in altitude of the two stations.

The invention is not restricted to the constructional forms shown in the drawings. Instead of the plate carrying the spiral being movable and the scale fixed, a movable scale may be used in front of a fixed plate or both scale and plate may be movable.

Finally the accuracy may be increased by adding to the graduated scale a vernier movable along this latter.

Furthermore the indicating device forming the object of the invention may advantageously replace the needle and dial systems, in a considerable number of measuring instruments, notably in manometers, amperometers, voltmeter, watt meters, frequency meters, meters of all kinds, checking devices for factories, similar instruments for laboratories and for aircraft and other purposes.

The altimeter shown by way of example in Figs. 8 and 9 comprises a rotary plate 15 of transparent material mounted upon a support 33. The axis 34 of this plate is commanded by an aneroid diaphragm forming a vacuum chamber (not shown). On the plate 15 there is traced a spiral C and, behind this plate, there is mounted a scale F which permits of the reading off, at the point of intersection with the spiral C, the number of thousands of meters contained in the value of the altitude.

Upon the plate 15 there are traced in addition several spirals $c_0$, $c_1$, $c_2$, and a scale $f$ placed behind the plate 15 gives, by its intersection with one of these curves, the figures for hundreds and tens of meters contained in the altitude. The value of the altitude is thus obtained by successively taking two readings, one from the scale F with the assistance of the curve C and the other $f$ with the aid of that of the curves $c_0$, $c_1$, $c_2$, which encounter it.

In order to avoid all confusion, the curve C of the one part and the curves $c_0$, $c_1$, $c_2$, are made of different colors.

A cover 16 placed in front of the rotary plate 15 is formed with two apertures 31 and 32 disclosing the scales F and $f$.

In order to obtain the indication of the altitude estimated in relation to a definite station, it is preferable to furnish the two scales F and $f$ with an arrangement enabling their zero point to be adjusted. Such an arrangement is shown in Fig. 9, the scale F guided by a projection 35 in a groove 36 of the support 33 carries a screwthreaded lug 37 or engagement screw 38 the end of which may turn without advancing in a lug 39 of the support 33. By acting upon the screw 38 the whole scale F may be caused to rise or descend. The scale $f$ is provided with a similar device which permits of its graduation being so released as to correspond to that of the scale F.

The auxiliary curves $c_0$, $c_1$, $c_2$, instead of cutting the main curve C may be arranged upon the circumference of the disk 15, the central portion being reserved for the principal spiral C. In Fig. 10 it is assumed that the case is that of a revolution indicator or speedometer. The number of hundreds is read off on the scale F by the aid of the principal spiral C; the number of tens is read off from the scale $f$ by the aid of those of the curves $c_0$, $c_1$, $c_2$, which meet it. The figure for the units is obtained by interpolating at sight on this latter scale.

The arrangement forming the object of this invention is adapted to the measurement of a dimension varying according to any law with reference to the angular displacement of the movable organ. If the size varies in proportion to this angular displacement as, for example in the case of a barometer measuring the atmospheric pressure, the curves $c_0$, $c_1$, $c_2$, are superimposable. In this case use may be made of only one of these curves and several suitable curves may be traced upon the plate.

This is what has been assumed in Fig. 11 where the reading of the units of superior order is effected by the aid of spiral C and scale F while the units of inferior order are read off by means of a single curve $c$ at its intersection with that of the auxiliary graduations $f_0$, $f_1$, $f_2$, which it encounters.

Instead of being traced on the plate, as hereinbefore assumed, the auxiliary curves may be formed by a rigid wire or by the contour of the suitably cut plate.

Whatever the mode of realization adopted may be the use of the spirals or of the auxiliary scales replaces a vernier with advantage.

What I claim as my invention and desire to protect by Letters Patent is:—

1. An indicating device of constant sensitiveness for measuring apparatus such as barometers, manometers, amperometers, voltmeters, and the like, comprising a scale graduated in divisions of equal length and a plate movable angularly in relation to the scale and upon which there is traced a spiral having its point of origin upon the axis of rotation and representing in polar coördinates the variations of the dimension to be measured as a function of the angular rotary displacements of the scale and of the plate, the number read off at the intersection of the scale and of the spiral giving the value of the dimensions, substantially as described.

2. In an indicating device as in claim 1, the utilization of a plate carrying instead of a single spiral a series of spirals corresponding to different conditions, substantially as decribed.

In witness whereof I affix my signature.

PIERRE MAURICE FRANCOIS DUGIT-GROS,
dit MAURICE DUGIT.

Witnesses:
JULIAN KEMBLE FREDBERG,
LUCIENNE BOUVERET.